United States Patent [19]

Spurney

[11] Patent Number: 4,764,677
[45] Date of Patent: Aug. 16, 1988

[54] WELL LOGGING DETECTOR

[75] Inventor: Richard W. Spurney, Hudson, Ohio

[73] Assignee: Bicron Corporation, Newbury, Ohio

[21] Appl. No.: 933,479

[22] Filed: Nov. 21, 1986

[51] Int. Cl.$^4$ .............................................. G01T 1/20
[52] U.S. Cl. ........................... 250/361 R; 250/363 R; 250/368
[58] Field of Search ................ 250/361 R, 368, 363 R

[56] References Cited

U.S. PATENT DOCUMENTS

| | | | |
|---|---|---|---|
| 3,950,646 | 4/1976 | Whitlock | 250/361 R |
| 4,004,151 | 1/1977 | Novak | 250/483.1 |
| 4,158,773 | 6/1979 | Novak | 250/361 R |
| 4,177,378 | 12/1979 | Stevens | 250/363 R |
| 4,360,733 | 11/1982 | Novak et al. | 250/361 R |
| 4,383,175 | 5/1983 | Toepke | 250/361 R |

OTHER PUBLICATIONS

Baron et al., "A Gas Scintillation Detector for Soft X-Radiation", *Instruments and Experimental Techniques*, USSR, vol. 17, No. 3, pt. 1, pp. 693–695, Patent Associated Literature—May 1974.
Fowler et al., "Experimental Flight of a Large Spherical Gas Scintillator", *Nuclear Instruments and Methods*, vol. 119, No. 2, pp. 381–387, Jul. 1974.
Northrop et al., "Relative Scintillation Efficiencies of Noble Gas Mixtures", 10/1958, *Nuclear Instruments*, pp. 207–212.
Andresen et al., "A Sealed Xenon Gas Scintillation Proportional Counter for X-ray Astronomy", 2/1976, *IEEE Transactions on Nuclear Science*, vol. NS-23, No. 1, pp. 473–475.

*Primary Examiner*—Janice A. Howell
*Assistant Examiner*—William F. Rauchholz
*Attorney, Agent, or Firm*—Pearne, Gordon, McCoy & Granger

[57] ABSTRACT

A scintillation detector is provided which has a scintillation member comprised of a substance which converts energy received in the form of an ionizing particle to light. The scintillation member, such as a thallium-activated alkali halide crystal, is sealed in a housing containing an atmosphere which is substantially non-reactive to the scintillation member at temperatures ranging from about 100° C. to about 250° C. Examples of suitable atmospheres include the noble gases including helium, neon argon, krypton, xenon and radon; nitrogen; carbon dioxide, a vacuum, and other atmospheres, such as mixtures of these or air which has been substantially depleted of oxygen. Processes for the manufacture of the detector are taught where the scintillation member is encapsulated in a non-reactive atmosphere such as ones listed above. Alternatively, the reactive atmosphere can be washed from the housing or the sealed housing can be evacuated and refilled with a non-reactive atmosphere.

19 Claims, 1 Drawing Sheet

WELL LOGGING DETECTOR

BACKGROUND OF THE INVENTION

This invention relates generally to scintillation detectors which are used, for example, to measure radiation at successive depths of bore holes in the earth and, more particularly, to a scintillation detector which has improved performance and durability.

Scintillation detectors include a scintillation crystal which emits light when subjected to an ionizing particle. The crystal is surrounded by a reflector which receives and reflects light from the crystal. The crystal and reflector are enclosed in a housing having a window which is translucent to the light produced by the crystal. The light from the crystal is then passed through the window into a photomultiplier tube and converted to an electrical signal. This process can be used to identify the type and quantity of isotopes that are present.

The crystals which are used in such detectors are frequently metal halide crystals, such as thallium-activated metal halide crystals. It has been known that these metal halide crystals are frequently hygroscopic and absorb water on their surfaces from the air. This causes a film to develop on the crystal surface which degrades the reflectivity of the crystal walls and causes a severe reduction of light output. This reduction of light output adversely affects the performance of the crystal. To prevent this, the detectors are assembled within a dry box to reduce exposure to moisture and the scintillation crystals are typically hermetically-sealed in metal containers or housings.

U.S. Pat. No. 4,004,151, assigned to the assignee of the present invention and incorporated herein in its entirety, discloses a scintillation detector of the type to which this invention relates. This reference describes a detector including a tubular case which encapsulates a scintillation crystal. The tubular case is closed by a plug or cap at one end and the crystal is spring-loaded toward a window at the other end with which the crystal is optically coupled. This spring loading allows for thermal expansion of the crystal relative to this case resulting from the higher coefficient of thermal expansion of the crystal than the case material. In addition, the patent describes in considerable detail, the types of scintillation crystals employed in such devices, their operation, and requirements.

U.S. Pat. No. 4,158,773, also assigned to the assignee of the present invention and incorporated herein in its entirety, discloses a scintillation detector having a special light transfer and reflector means comprising a soft, elastic, silicone, rubber sleeve to improve shock absorption for the protection of the crystal while enhancing light reflection of the crystal.

U.S. Pat. No. 4,383,175, also assigned to the assignee of the present invention and incorporated herein in its entirety, again discloses a similar scintillation detector which has an improved, hermetically-sealed housing and window assembly to reduce the exposure of the crystals to moisture.

One of the major uses of scintillation detectors is in the oil well industry. The detectors are lowered into the bore hole along with other instruments to collect geological data on rock strata to determine whether the well is going to be an effective producer. The process is commonly known as logging the well. During its excursion down the bore hole, the instrument package may be exposed to shock loads as high as 100 to 150 g, and temperatures as high as 200° C. For these reasons, the crystals are mounted in the containers with special shock mounting techniques to prevent damage to the crystal.

The present invention has isolated and met the major problems encountered with this use of the detectors. These problems are that the high-shock and vibration loads will cause the reflective media inside the detector to shift and that subsequent prolonged exposure of the detector to temperatures in the 150° C. to 250° C. range causes a brown film to develop on the crystal surface. This degrades the performance of the detector. It is believed that one reason why these problems have not been understood is that the scintillation detectors are so inaccessible during use and it was easy to place the blame generally for decreased performance on mechanical and thermal trauma encountered during placement and use.

The oil well logging crystal is typically, a long, narrow configuration coupled to the exit window at one end of the housing. The window is coupled to the photo tube. The performance of this configuration is dependent to a large extent on uniform light production along its entire length. Shifting of the powder reflectors, due to excess vibration, upsets the light balance and causes degraded performance. To solve this problem, Teflon tape, a high temperature plastic with good reflective qualities has been tried as a reflector. This material provides a very effective stationary reflector which allows for crystal expansion under heat and doesn't shift under shock and vibration. However, a disadvantage to the tape is that the long-term temperature degradation is magnified and light output can drop as much as 60 percent.

This invention inhibits the degradation that occurs with both powder reflectors and with Teflon tape.

SUMMARY OF THE INVENTION

The present invention is directed to novel and improved scintillation detectors. The patent relates additionally to an improved method of construction of scintillation detectors.

In accordance with the invention, a hermetically-sealed housing encapsulates an elongated scintillation crystal in an atmosphere of non-reactive gas. This provides an increased life span for the detector.

The housing is illustrated as a stainless steel tube having a light-transmitting window at one end. The window is retained within a window assembly which seals the window in the housing.

The scintillation crystals operate by converting the energy of the ionizing particles of gamma rays to light energy. Types of crystals which are effective include alkali metal halide crystals which have been activated by the inclusion of thallium, cesium halide crystals, bismuth germanate; and plastic scintillators.

Since the performance of the crystal depends on how effectively the light produced can be collected, the crystal is surrounded by a reflector for light in the 300 nm to 500 nm wavelength region. In addition, this reflector helps to insulate the crystal from shock. Thus, it is desirable to use reflective powders of metal oxides, such as $Al_2O_3$ or $MgO$, as the reflector. Polytetrafluoroethylene tape, (known by the DuPont trademark "Teflon"), which is wrapped around the crystal surface is also effective.

The crystal, surrounded by the reflector-shock absorber, is sealed in the housing in an atmosphere which substantially reduces the exposure of the crystal to moisture and reactive gases such as oxygen. In one embodiment of the invention, the crystal is sealed in an atmosphere of a non-reactive gas, such as nitrogen, $CO_2$, or any of the noble gases.

The invention also relates to methods of manufacturing the detector. In a first embodiment, the crystal is encapsulated in a non-reactive atmosphere in the housing. Such encapsulation can be accomplished by assembly of purged components in a work box filled with the non-reactive gas.

In another embodiment, the detector is formed by assembling the detector and subsequently evacuating the housing and using a non-reactive gas to backfill the housing. Alternatively, in this embodiment, after assembly, the atmosphere within the detector is purged with a non-reactive gas.

These techniques allow the manufacturer of well logging detectors which are both temperature stable and immune to the changes from the reflector shifting inside the container.

These and other aspects of this invention are more fully described in the following description and drawings.

DETAILED DESCRIPTION OF THE DRAWINGS

Figure 1:
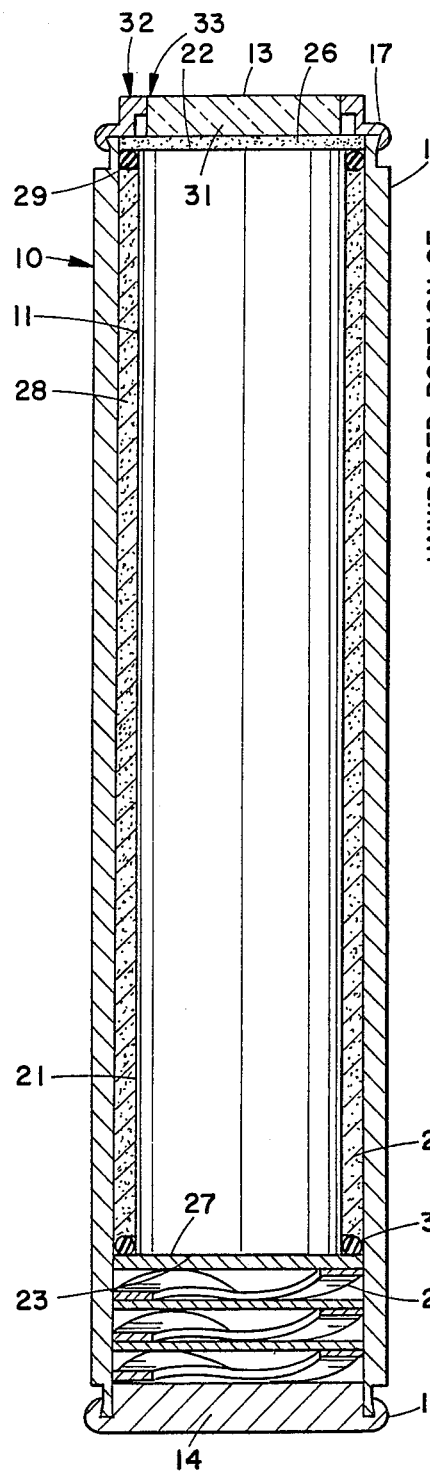
FIG. 1 is a side elevation in longitudinal section of an assembled scintillation detector in accordance with the present invention, illustrating a first embodiment of the invention where the reflective media is a reflective powder.

FIG. 1 illustrates a typical scintillation detector incorporating the present invention. The detector includes a tubular, stainless steel housing 10 which encloses a cylindrical scintillation crystal 11.

The crystal may be composed of an alkali metal halide which has been activated by the inclusion of thallium, sodium, or rare earths, such as NaI(Tl), KBr(Tl), KI(Tl), and KCl(Tl); CsI(Tl) and CsI(Na); and LiI(Eu) bismuth germanate; or a plastic scintillator, such as NE102 Polyvinyl Toluene plastic. Plastic scintillators are molecular crystals in which the intermolecular bonding is quite weak as compared to the bonding of ionic crystals and in which photoluminescence arises from deexcitation of the first excited electronic state. Molecules which have high resonance energy, such as unsaturated cyclic molecules and more specifically, benzene or benzene derivatives, exhibit excellent organic scintillation properties. A plastic scintillator may consist of a matrix of one or more flourescent organic compounds dissolved in a solid plastic base. Some examples of the flourescent compounds are, but not limited to, POPOP, tetraphenylbutadiene, butyl-PBD and naphthalene. Examples of the plastic materials are polyvinyltoluene, polystyrene, polymethylmethacralate, polyethylmethacralate, and copolymers of these. These plastics may also incorporate cross-linking additives such as, but not limited to divinylbenzene. U.S. Pat. No. 3,960,756 to Noakes assigned to the same assignee, discusses organic scintillation matrices and is incorporated herein by reference.

The housing 10 consists of a tubular metal body 12 closed at one end by a window assembly 13 and at the other end by a metal plug or cap 14. Both the window assembly 13 and the plug 14 are sealed at the associated ends of the body 12 by peripheral welds at 17 and 18, respectively.

The crystal 11 is cut or machined to provide a right angle cylinder having a smooth, cylindrical external surface 21 and flat and parallel end faces 22 and 23. The end face 22 is positioned adjacent to the window assembly 13 and a spring system 24 is positioned between the end cap or plug 14 and the other end face 23 to resiliently urge the crystal 11 toward the window assembly 13. This maintains an optical coupling via a layer of suitable optical coupling material 26 between the crystal 11 and the window assembly 13. Positioned between the spring system 24 and the end face 23 of the crystal 11 is a backplate 27 formed of a scintillating light-reflecting material. In the illustrated embodiment, the spring system includes several wave springs and spacer plates. However, other types of spring systems may be utilized, if desired.

The window assembly 13 is formed of a cylindrical piece of glass 31 hermetically sealed within a window-retaining ring 32. The glass material is transparent to the type of light generated by the associated scintillation crystal 11 when such crystal is bombarded by ionizing radiation.

An example of a type of glass which may be used in the window assembly 13 is a soda-lime glass having a coefficient of thermal expansion at room temperature of approximately $8 \times 10^{-6}$ to $10 \times 10^{-6}$ inches per inch per degree centigrade. The ring 32 may, for example, be a stainless steel ring with a coefficient of thermal expansion of about $9 \times 10^{-6}$ to $12 \times 10^{-6}$ inches per inch per degree centigrade. For a particular assembly, when a compression seal is desired, the ring 32 is selected to have a slightly greater coefficient of thermal expansion than the glass 31, and this differential thermal expansion is used to establish a compression seal at the interface 33 between the glass 31 and the ring 32.

The compression seal alone can be used to provide the hermetic seal when required. For example, when the ring is formed of a nickel-plated, cold-rolled steel, the glass does not produce any significant chemical bond with the nickel plating material. However, when the coefficients of thermal expansion are related, for example, as set forth above, and the cooling is properly controlled, the ring is in tension and the glass is in compression to produce a compression seal therebetween.

The compression seal can be accomplished by heating the glass 31 and ring 32 above the working temperature of the glass so that the glass flows into contact with the ring as is described in U.S. Pat. No. 4,383,175 assigned to the same assignee of the current application. This reference which previously has been incorporated herein by reference, also describes structures and methods of securing the window assembly 13 to the tubular body 12 which involves fusing the metal tubular body 12, the ring 32 and the cap 14. Similar methods may be used to seal the cap 14 to the other end of the tubular body 12.

After the cooling is completed, the glass 31 is ground and polished, as required, to produce the desired scintillation light transmission characteristics.

Positioned around the external surface 21 of the crystal 11 is a reflective media 28 which serves two functions. The primary function is to reflect light and improve the performance of the detector by improving the collection of the light produced by the crystal. A secondary function of the reflective media 28 is to help protect the crystal from the high-shock loads which the detector may experience during use. In the first embodiment of the present invention, the reflective media 28 is a light reflective powder such as metal oxides like $Al_2O_3$ or MgO. The powder is packed between the crystal 11 and the tubular housing 12. A lubricating layer, such as a skived sheet of Teflon, may be positioned between the crystal surface 21 and the reflective media 28 in order to reduce load forces on the crystal 11 caused by the difference in thermal expansion coefficients.

On either end of the crystal 11, an O-ring 29, 30 is disposed about the crystal 11. These O-rings maintain the alignment of the crystal 11 and trap the powder packing along the length of the crystal to maintain the powder in contact with the crystal surface. In this way, the powder is maintained almost like a solid sleeve.

Figure 2:
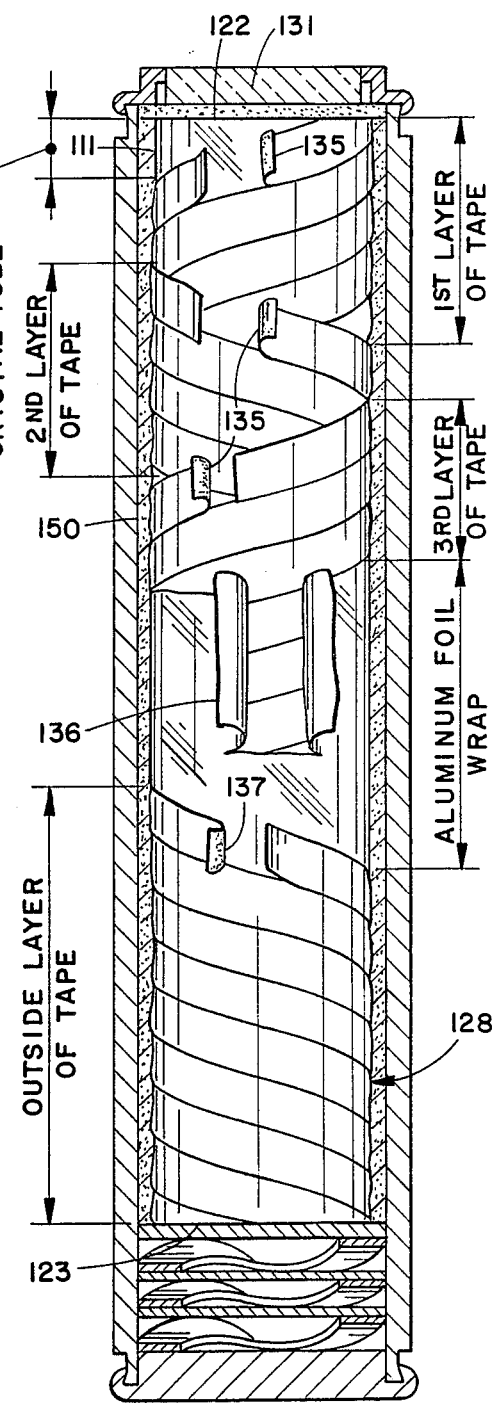
FIG. 2 is a side elevation in longitudinal section of an assembled scintillation detector in accordance with the present invention, illustrating a second embodiment of the invention where a layer of Teflon is utilized as the reflective media.

In an alternative embodiment of the invention illustrated in FIG. 2, the reflective media 128 is polytetrafluoroethylene ("Teflon") such as one or more layers of Teflon tape. The tape is wrapped around the curved crystal 111 surfaces so that the tape edges overlap. In the view that is shown in FIG. 2, the crystal 111 is wrapped with tape so that three layers 135 of Teflon are formed. A 0.001 inch layer of aluminum foil 136 covers this and is finally covered by another single layer 137 of Teflon tape. An additional layer of shock-absorbing material 150 such as a potting composition or powder may be used in this embodiment to help protect the crystal from shock and to provide additional support. The planar end surface 123, may also be wrapped. The planar end surface 122 is not wrapped to permit light measurement through the window 131.

The crystal is sealed in the tubular housing in a substantially non-reactive atmosphere. In the past, it has not been known that the atmosphere within the housing can affect the performance and the longevity of scintillation detectors and the crystals have been sealed in air.

The problems presented by using an air atmosphere become evident in particular after the detector has been lowered into the bore hole. While it was previously known that the detector's performance could deteriorate in situ, an understanding of these problems has now been developed and is supported by the evidence which follows. During the lowering process and while in place, the detector may be subjected to high shock loads and temperatures. These conditions apparently cause changes in the reflective packing layer 28, which lead to the degradation of the crystal. When reflective powders are used, the high-shock and vibration loads cause the reflective powder to shift. As a result, over a period of time, the prolonged exposure of the crystal to an oxygen-containing atmosphere in a closed container, at these raised temperatures of 100° C. to 200° C. causes a brown film to develop on the crystal surface. This film degrades the efficiency of the reflective media surrounding the crystal.

The scintillation detector crystal 11, is a long, narrow, right angle cylinder optically coupled at one end to a photomultiplier. Uniform light production along the entire length of the crystal is necessary to ensure proper performance of the crystal. Shifting of the reflective media upsets the balance of the light production and causes degraded performance. This problem is heightened where the crystal surface 21 has an increased exposure to an oxygen atmosphere and the light-inhibiting film develops at the crystal surface. This degradation of the detector, having a powder reflective media and an air atmosphere has been observed to decrease light output between 10% and 20%.

It was believed that the degradation problems were largely a result of the shifting of the reflective powder media 28. One solution to this problem was to add the O-rings, 29, 30 to help retain the powder in the proper position in contact with the crystal surface 21. a further attempt to solve this problem was to substitute Teflon tap (as shown in FIG. 2) for the reflective media 28. Teflon was chosen because it is a high-temperature plastic with good reflective qualities. Other plastics with similar characteristics could be substituted. It was believed that the Teflon would be soft enough to allow for crystal expansion and not shift under shock and vibration. However, the substitution of the Teflon tape for the powder reflective media did not solve the degradation problem as the long term temperature degradation became magnified. Light output dropped as much as 60%. It is believed that the tape traps the film at the crystal surface and that other solids, such as aluminum foil or a reflective sleeve would act in the same manner.

These problems are solved by the present invention by encapsulation of the crystal 11 in a non-reactive gas. Examples of suitable gases include nitrogen, carbon dioxide and argon, although any inert or relatively non-reactive atmosphere will also work. As used in this application, a non-reactive atmosphere should be understood as an atmosphere which contains no reactive oxygen or has been substantially depleted of oxygen.

Several methods can be used to accomplish the desired result. The following examples illustrate the present invention:

The crystal 11 may be encapsulated with a non-reactive gas or the housing 10 may be evacuated after encapsulation and backfilled with a non-reactive gas. Alternatively, the housing 10 may be purged after encapsulation until all of the reactive gases have been replaced by the non-reactive gas.

In order to accomplish encapsulation with a non-reactive gas, the detector can be assembled in a work box which contains the non-reactive atmosphere. The cleaned components of the detector are placed in the work box and purged with an appropriate gas, such as argon. The components can then be assembled within the work box which contains the argon atmosphere. The housing 11 is subsequently sealed.

As an alternative, the detector can be assembled to form a sealed unit as is known but the atmosphere in the housing can then be evacuated and the housing can be backfilled with a non-reactive gas. Similarly, the sealed unit can be purged of the reactive gas, such as by washing with a non-reactive gas. When the gas overflow from the housing is non-reactive and stable in composition, (i.e. relatively pure non-reactive gas) then the housing may be sealed shut.

EXAMPLE 1

Effect of Argon on G-Style Temperature Degradation

Four detectors were built with Teflon tape, two were assembled using current standard practice, the other two were built in an argon atmosphere.

Preparation:

A dry box was used for the assembly of the detector. This box comprises a container forming a closed environment accessible by sealed access ports having gloves to allow the materials to be assembled. The dry box was opened and thoroughly cleaned. The detector hardware was cleaned by the standard shake and bake method. The scintillation crystals were interfaced to the glass in the dry box. All hardware, canning materials, and reflector materials were then placed in the clean welding box. For the two argon detectors, the dewpoint of the argon cylinder was measured −55° C. on the automatic dewpoint meter. The argon cylinder was then attached to the welding box and the box purged with argon until a dewpoint of −55° C. was obtained with the dewpoint meter.

Assembly:

The crystal surfaces were prepared by standard practice in the air or argon atmosphere. The crystals were wrapped with three wraps of Teflon tape, then a layer of 0.001 inch aluminum foil and a fourth wrap of Teflon tape. The crystals were then welded into these housings in dehydrated air or the argon atmosphere.

Test Method:

A 2" standard tube was used to measure pulse height and resolution. The 1⅛"×1⅛" standard crystal was set to channel 1000 on the standard tube. The electronic pulser was also set to channel 1000. The four 1½"×4" crystals were measured for pulse height and pulse height resolution before and after repeated heat cycles to 160° C. with a four-hour soak at temperature. Results and data are below:

Data Interpretation:

The performance of a scintillation crystal can be determined relative to the brightness of light emitted in response to impingement by a single gamma ray. The light which is recorded has a Gaussian distribution where the height of the curve is called the pulse height or peak channel, and the width of the curve is called the resonance. A sharper resonance reflects a clearer pulse resolution and higher pulse height.

For scintillation crystals, these measurements are taken twice, once with the source orientation parallel to the long axis of the crystal, this is known as an "end on" measurement, and once with the source orientation transverse to the long axis of the crystal, this is known as a "broad beam" measurement. Ideally, if the crystal is balanced, these two measurements should approximate each other.

The results are set forth below. "P.H." indicates pulse height and "Res." indicates the resonance.

| Unit | Condition | End On P.H./Res | Pulse Height Change | Broad Beam P.H./Res | Pulse Height Change |
|---|---|---|---|---|---|
| 1st cycle 160° C. Four Hour Soak at Temperature ||||||
| Standard | Before bake | 1000/— | | | |
| Argon 1 | Before bake | 834/6.7 | | 831/6.4 | |
| Argon 2 | Before bake | 828/6.7 | | 827/6.8 | |
| Air 1 | Before bake | 852/6.7 | | 847/7.0 | |
| Air 2 | Before bake | 879/6.6 | | 875/6.6 | |
| Standard | After test | 998/ | −2 ch. | | |
| Argon 1 | After 1st bake | 820/6.7 | −14 (1.7%) | 816/6.7 | −15 (1.7%) |
| Argon 2 | After 1st bake | 807/6.8 | −21 (2.5%) | 804/6.8 | −23 (2.8%) |
| Air 1 | After 1st bake | 796/6.9 | −56 (6.6%) | 789/6.7 | −58 (6.8%) |
| Air 2 | After 1st bake | 824/6.5 | −28 (3.2%) | 824/6.6 | −27 (3.2%) |
| Standard | After test | 1002/ | +2 ch. | | |
| 2nd cycle 160° C. Four Hour Soak at Temperature ||||||
| Argon 1 | After 2nd bake | 818/6.8 | −16 (1.9%) | 815/6.7 | −16 (1.9%) |
| Argon 2 | After 2nd bake | 809/6.8 | −19 (2.3%) | 805/6.7 | −22 (2.7%) |
| Air 1 | After 2nd bake | 772/7.0 | −80 (9.3%) | 768/7.0 | −79 (9.3%) |
| Air 2 | After 2nd bake | 803/6.8 | −76 (8.6%) | 800/6.8 | −75 (6.5%) |
| Standard | After test | 1010/— | +10 ch 1% | | |
| 1st cycle 180° C. Four Hour Soak at Temperature ||||||
| Argon 1 | After 3rd bake | 813/6.7 | −21 (2.5%) | 809/7.0 | −23 (2.8%) |
| Argon 2 | After 3rd bake | 800/6.8 | −28 (3.4%) | 797/6.8 | −30 (3.6%) |
| Air 1 | After 3rd bake | 729/7.1 | −123 (14.4%) | 723/7.1 | −124 (14.6%) |
| Air 2 | After 3rd bake | 744/6.9 | −135 (15.4%) | 740/6.8 | −135 (15.4%) |
| Standard | After test | 1000 | +0% | | |
| 2nd cycle 180° C. Four Hour Soak at Temperature ||||||
| Argon 1 | After 4th bake | 800/6.8 | −34 (4.1%) | 797/6.8 | −35 (4.2%) |
| Argon 2 | After 4th bake | 790/6.8 | −38 (4.6%) | 787/6.8 | −40 (4.8%) |
| Air 1 | After 4th bake | 655/7.2 | −197 (23.1%) | 650/7.2 | −197 (23.3%) |
| Air 2 | After 4th bake | 684/7.1 | −195 (22.2%) | 679/7.1 | −196 (22.4%) |
| Standard | After test | 997 | −3 ch | | |

| Unit | End Of P.H./Res | Pulse Height Change | Broad Beam P.H./Res | Pulse Height Change |
|---|---|---|---|---|
| 1st cycle 200° C. Four Hour Soak at Temperature |||||
| Argon 1 | 781/6.9 | −53 (6.4%) | 779/6.8 | −53 (6.4%) |
| Argon 2 | 779/6.9 | −49 (5.9%) | 777/6.9 | −50 (6.0%) |
| Air 1 | 545/7.8 | −307 (36.0%) | 541/7.6 | −306 (36.1%) |
| Air 2 | 580/7.5 | −299 (34.0%) | 576/7.4 | −299 (34.2%) |
| Standard | 981 | −19 (1.9%) | | |
| | | Standard 981 | | Pulser 1000 |
| 2nd cycle 200° C. Four Hour Soak at Temperature |||||
| Argon 1 | 777/6.9 | −57 (6.8%) | 775/6.9 | −57 (6.9%) |
| Argon 2 | 774/6.8 | −54 (6.5%) | 770/6.9 | −57 (6.9%) |
| Air 1 | 498/8.1 | −354 (41.5%) | 494/7.7 | −353 (41.7%) |
| Air 2 | 531/7.8 | −348 (39.6%) | 526/7.6 | −349 (39.9%) |
| Standard | 992 | −8 (.8%) | | |

-continued

Pulser 1000

Analysis:

After two, four-hour cycles at 160° C., the two Argon-filled detectors decreased in pulse height an average of 2.2%, while the two air-filled samples decreased an average of 8.4%. After two, four-hour cycles at 180° C., the two Argon-filled detectors lost an additional 2.2% pulse height, while the air-filled samples dropped an additional 14.4%. After two, four-hour cycles at 200° C., the Argon-filled samples showed a total less for all cycles of 6.8% pulse height, while the total loss in pulse height for the air-filled samples was 40.7%.

These tests show that the substitution of a non-reactive gas for air with the detector-housing assembly substantially increases the performance and the length of performance of the detector. The effect of the invention is seen more dramatically as the temperature to which the detector is exposed increases and the length of exposure to the unfavorable conditions increase.

It would not initially have been obvious that a non-reactive atmosphere would be preferable to air since the advantage only becomes clear on exposure to increased temperature after a prolonged period. The pulse height of the crystal when encapsulated in argon is lower than air before the unit is subjected to heat for extended periods.

hours at 200° C. showed no significant change from the samples after 12 hours (i.e. 12.6% and 12.5% respectively). This example illustrates an inert gas, such as argon, is the preferred atmosphere, but that detectors having a non-reactive atmosphere such as nitrogen and $CO_2$ atmospheres perform better than detectors having air atmospheres.

"T.T." designates Teflon tape as a reflective media.

| Test | | Assembly Procedures | P.H. Change After 24 Hr. at 185° C. | P.H. Change After 12 Hr. at 200° C. |
|---|---|---|---|---|
| #1 | 2 each 1.5" × 4" | Crystals were sanded, wrapped in T.T. and welded in argon. | −6.9%<br>−6.8% | −12.7%<br>−12.4% |
| #2 | 2 each 1.5" × 4" | Crystals were sanded, wrapped in T.T. and welded in dry box air. | −57.7%<br>−58% | −61.3%<br>−62.4% |
| #3 | 2 each 1.5" × 4" | Crystals were sanded, wrapped in T.T. and welded in nitrogen. | −13.1%<br>−21% | −15.6%<br>−23.3% |
| #4 | 2 each 1.5" × 8" | Crystals were sanded, wrapped in T.T., sides were vibrated with $Al_2O_3$. The back of the crystal was packed in $Al_2O_3$. All processes were done in argon. | −8.3%<br>−12.6% | −7.8%<br>−12.3% |
| #5 | 4 each 1" × 8" | Crystals were sanded and vibrated with $Al_2O_3$ in dry box air. Before the backs were welded, units were put in a vacuum for 2 hours and opened to argon and welded. | −8.1%<br>−5.5%<br>−5.2%<br>−5.6% | |
| #6 | 4 each 1" × 8" | Crystals were sanded, vibrated with $Al_2O_3$ and welded in dry box air. Standard procedure. | −14.7%<br>−12.3%<br>−13.2%<br>−16.3% | |
| #7 | 2 each 1.5" × 4" | Crystals were sanded and wrapped in T.T. and welded in $CO_2$. | −12.6%<br>−8.5% | |

EXAMPLE 2

Test Method:

Tests were run using preparation assembly techniques and testing techniques similar to those of Example 1. For this example, the performance of detectors were tested for the size crystals noted and for crystals prepared as described in the tables. Pulse height was measured at time zero, after 24 hours at 185° C., and after 12 hours at 200° C. The change in pulse height was recorded as a percentage change of the initial figure.

Analysis:

Once again, significant improvement was shown in the level of pulse height maintained for detectors having non-reactive atmospheres. An additional pulse height measurement of the first test samples after 24

EXAMPLE 3

Effect of Nitrogen on Temperature Degradation

Four detectors each having 1.5"×4" inch crystals were built with Teflon tape reflectors. Two were assembled using current standard practice, and the other two were built in a nitrogen atmosphere.

Preparation:

A dry box as described in Example 1 was used for the assembly of the detector. The dry box was opened and thoroughly cleaned. The hardware was cleaned by the standard shake and bake method. The crystals were interfaced to the glass in the dry box. All hardware, canning materials, and reflector materials were then placed in the clean welding box. The dewpoint of the nitrogen cylinder was measured −55° C. on the automatic dewpoint meter. The nitrogen cylinder was then attached to the welding box and the box purged with nitrogen until a dewpoint of −55° C. was obtained with the dewpoint meter; this took two hours.

Assembly:

The crystal surfaces were prepared by standard practice in the nitrogen atmosphere. The crystals were wrapped with three wraps of Teflon tape, then a layer of 0.001 inch aluminum foil and a fourth wrap of Teflon tape. The crystals were then welded into these housings in the nitrogen atmosphere.

Test method:

A 2" standard tube was used to measure pulse height and resolution. The 1⅛"×1⅛" standard crystal was set to channel 1000 on the standard tube. The electronic pulser was also set to channel 1000. The 1½"×4" crystal was measured for pulse height and pulse height resolution before and after repeated heat cycles to 160° C. with a four-hour soak at temperature. Results and data are below.

Analysis:

The pulse height change for the nitrogen samples was not as good as had been observed for the argon samples but the changes were relatively steady and about half the amount of change observed for samples sealed in air and subjected to similar conditions. This shows that nitrogen is also a suitably non-reactive gas to function in the present invention.

placed in an oven and attached to the research furnace vacuum system. The detector was then evacuated to less than 1 micron and pumped overnight. The furnace was taken up to 215° C. for 16 hours with the vacuum system pumping on the detector. Pulse height and resolution measurements were made before and after the bake cycle. (See data). The detector was then sealed and baked again at 215° C. for 16 hours. Pulse height and resolution was measured again. (See data).

During the sealed bake, the vacuum gauge drifted up to 500 microns and stopped, indicating a small leak was present.

At this point, the crystal was removed from the con-

|  | End On P.H./Res | | Broad Beam P. H./Res | |
|---|---|---|---|---|
| Before Cycle | | | | |
| Nitrogen 1 | 860 | 7.1 | 867 | 7.0 |
| Nitrogen 2 | 888 | 6.9 | 886 | 7.0 |

|  | End On P.H./Res | | Pulse Height Change | | Broad Beam P.H./Res | | Pulse Height Change | |
|---|---|---|---|---|---|---|---|---|
| 160° C. after 4 hours | | | | | | | | |
| Nitrogen 1 | 831 | 7.3% | −29 | 3.4% | 839 | 7.2% | −28 | 3.2% |
| Nitrogen 2 | 853 | 7.1% | −35 | 3.9% | 849 | 7.3% | −37 | 4.2% |
| Standard | 1008 | | +8 | .8% | | | | |
| | | | | | Pulser @ Test 1003 | | | |
| 160° C. after 5½ hours | | | | | | | | |
| Nitrogen 1 | 819 | 7.4% | −41 | 4.8% | 828 | 7.0% | −39 | 4.5% |
| Nitrogen 2 | 839 | 7.1% | −49 | 5.5% | 833 | 7.3% | −53 | 6.0% |
| Standard | 1005 | | +5 | .5% | | | | |
| | | | | | Pulser 1001 | | | |
| 180° C. after 4 hours | | | | | | | | |
| Nitrogen 1 | 807 | 7.3% | −53 | 6.2% | 815 | 7.1% | −52 | 6.0% |
| Nitrogen 2 | 820 | 7.2% | −68 | 7.7% | 814 | 7.4% | −72 | 8.1% |
| Standard | 996 | | −4 | .4% | | | | |
| | | | | | Pulser 1000 | | | |
| 180° C. after 4 hours | | | | | | | | |
| Nitrogen 1 | 805 | 7.3% | −55 | 6.4% | 810 | 7.2% | −57 | 6.6% |
| Nitrogen 2 | 804 | 7.3% | −84 | 9.5% | 800 | 7.5% | −86 | 9.7% |
| Standard | 1010 | | +10 | 1.0% | | | | |
| | | | | | Pulser 1000 | | | |
| 200° C. after 4 hours | | | | | | | | |
| Nitrogen 1 | 785 | 7.5% | −75 | 8.7% | 792 | 7.1% | −75 | 8.7% |
| Nitrogen 2 | 779 | 7.3% | −109 | 12.3% | 771 | 7.8% | −115 | 13.0% |
| Standard | 1000 | | +0 | 0% | | | | |
| | | | | | Pulser 1000 | | | |
| After 4 hours @ 200° C. 2nd Cycle | | | | | | | | |
| Nitrogen 1 | 774 | 7.3% | −86 | 10% | 776 | 7.3% | −91 | 10.5% |
| Nitrogen 2 | 753 | 7.4% | −135 | 15.2% | 746 | 8.0% | −140 | 15.8% |
| Standard | 991 | | −9 | .9% | | | | |
| | | | | | Pulser 999 | | | |

EXAMPLE 4

Effect of Vacuum on Temperature Degradation

A 1.5"×6" housing was manufactured with threaded ends and O-ring seals. A copper tube was soldered into the back of the housing to permit evacuation.

A 1.5"×6" crystal was interfaced to the window of this container. The crystal was sanded all over in the dry box and sealed into the container. No reflector was used. All hardware was cleaned and leak treated with the helium leak checker before assembly. The detector was then leak checked. At this time, the leak checker indicated that there may have been some small leakage but it could not be pinpointed. The detector was then tainer because a substantial drop-in output had occurred. There was no indication of surface hydration at this time. The crystal was then wrapped in Teflon tape, and it became apparent that a brown discoloration was present on the crystal surface.

Pulse height measurements were made using the standard 1⅛×1⅛ crystal for comparison.

Analysis:

The vacuum samples again were not as favorable as the argon samples. It is possible that at least a portion of the results could be attributed to the pinpoint leak. However, by extrapolation, the results appeared to be superior to air samples for the same conditions.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

| Unit | Condition | End On P.H./Res | Pulse Height Change | Broad Beam P.H./Res | Pulse Height Change |
|---|---|---|---|---|---|
| Std. crystal | — | 1000 | | | |
| 1.5" × 6" | Before bake | 192/12.5 | | 196/16.9 | |
| Std. crystal | — | 1000 | | | |
| 1.5" × 6" | After 16 hours at 215° C. | 173/13.5 | −9.9% | 173/19.2 | −11.7% |
| 1.5" × 6" | After 16 hours at 215° C. (2nd Cycle) | 145/13.3 | −24.5% | 145/14.9 | −26.1% |

What is claimed is:

1. A scintillation detector comprising:
   a scintillation member capable of converting the energy of an ionizing particle to light energy;
   a housing encapsulating the scintillation member, the housing including light transmitting means which is optically coupled to the scintillation member
   sealing means which hermetically seals the housing; and
   an atmosphere which is substantially non-reactive with the scintillation member within said housing.

2. A scintillation detector as set forth in claim 1 further comprising reflector means within said housing which receives and reflects light from the scintillation member.

3. A scintillation detector as set forth in claim 2 wherein the reflector means comprises polytetrafluoroethylene.

4. A scintillation detector as set forth in claim 2 further comprising shock absorbing means which acts to shield the scintillation member from externally applied forces.

5. A scintillation detector as set forth in claim 4 wherein the reflector means and the shock absorbing means comprise a reflective metal powder disposed in the housing around the scintillation member.

6. A scintillation detector as set forth in claim 1 wherein said scintillation member is comprised of a member of the group consisting of alkali metal halide crystals, cesium halide crystals, bismuth germanate, or plastic scintillation compositions.

7. A scintillation detector as set forth in claim 1 wherein said scintillation member is comprised a member of the group consisting of NaI(Tl), NaBr(Tl), KBr(Tl), KCl(Tl), CsI(Tl), CsI(Na), or polyvinyl toluene plastic scintillators.

8. A scintillation detector as set forth in claim 1 wherein the atmosphere comprises one or more members chosin from the group consisting of helium, argon, nitrogen, carbon dioxide or a vacuum.

9. A scintillation detector as set forth in claim 1 wherein the atmosphere comprises a noble gas.

10. A scintillation detector comprising:
    an elongate scintillation member having longitudinal exterior surfaces, the scintillation member comprising an alkali metal halide crystal;
    a housing encapsulating the scintillation member and including a light-transmitting window which is optically coupled to the scintillation member and shock absorbing means which acts to shield the scintillation member from externally-applied forces;
    reflector means which cooperate with substantially all of the longitudinal exterior surfaces of the scintillation member and which reflect light having a wavelength from about 300 mm to about 500 mm;
    sealing means which hermetically seals the housing; and
    an atmosphere within the housing which is substantially non-reactive with the scintillation member at temperatures of about 150° C. to about 200° C.

11. A scintillation detector as set forth in claim 10 wherein the reflector means and the shock absorbing means comprise a reflective powdered metal.

12. A scintillation detector as set forth in claim 10 wherein the reflector means comprises a polytrafluoroethylene layer.

13. A process for the manufacture of a scintillation detector having components including a scintillation member, a housing, and housing sealing means comprising:
    placing the scintillation member within the housing;
    providing an atmosphere within the housing which is substantially non-reactive to the scintillation member at temperatures from about 150° C. to about 200° C.;
    assembling the housing and housing sealing means to hermetically seal the scintillation member within the housing.

14. A process for the manufacture of a scintillation detector as set forth in claim 13 wherein the steps occur sequentially.

15. A process for the manufacture of a scintillation detector as set forth in claim 14 including an initial step of purging the components of gases which are reactive to the scintillation member.

16. A process for the manufacture of a scintillation detector as set forth in claim 14 wherein all of the steps occur within a closed system having an atmosphere which is substantially non-reactive to the scintillation member at temperatures from about 150° C. to about 200° C.

17. A process for the manufacture of a scintillation detector as set forth in claim 13 wherein the step of assembling the housing occurs prior to the step of providing the atmosphere.

18. A process for the manufacture of a scintillation detector as set forth in claim 13 wherein the scintillation member is an alkali halide crystal and the substantially non-reactive atmosphere is one or more members chosen from the group consisting of the noble gases, nitrogen, or carbon dioxide.

19. A process for the manufacture of a scintillation detector as set forth in claim 13 wherein the substantially non-reactive atmosphere is a vacuum.

* * * * *